(12) United States Patent
Shane

(10) Patent No.: US 8,741,140 B2
(45) Date of Patent: Jun. 3, 2014

(54) SURFACE MODIFIED FILTRATION MEDIA

(75) Inventor: Bruce E. Shane, Delta, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 951 days.

(21) Appl. No.: 12/236,801

(22) Filed: Sep. 24, 2008

(65) Prior Publication Data

US 2009/0078637 A1    Mar. 26, 2009

Related U.S. Application Data

(60) Provisional application No. 60/974,593, filed on Sep. 24, 2007.

(51) Int. Cl.
*B01D 35/14* (2006.01)
*B01D 29/13* (2006.01)

(52) U.S. Cl.
USPC ...... 210/243; 210/490; 210/767; 210/748.01; 210/353; 210/348; 427/244; 96/15; 96/17; 96/69

(58) Field of Classification Search
USPC ......... 210/492, 483, 488, 499, 600, 749, 748, 210/739; 422/110, 60; 428/35.2; 55/528, 55/523, 360, 382
See application file for complete search history.

(56) References Cited

U.S. PATENT DOCUMENTS

| | | | |
|---|---|---|---|
| 2,826,309 A | 3/1958 | Forman et al. | |
| 3,022,187 A | 2/1962 | Eyraud et al. | |
| 3,224,592 A | 12/1965 | Burns et al. | |
| 3,591,010 A | 7/1971 | Pall et al. | |
| 4,169,911 A | 10/1979 | Yoshida et al. | |
| 5,527,569 A * | 6/1996 | Hobson et al. | 428/35.2 |
| 6,099,726 A | 8/2000 | Gembolis et al. | |
| 6,099,729 A | 8/2000 | Cella et al. | |
| 6,838,005 B2 | 1/2005 | Tepper et al. | |
| 2004/0245169 A1 * | 12/2004 | Breusch | 210/492 |
| 2005/0132885 A1 | 6/2005 | Zarganis et al. | |
| 2007/0028767 A1 * | 2/2007 | Choi et al. | 95/59 |

FOREIGN PATENT DOCUMENTS

| | | |
|---|---|---|
| EP | 0 331 270 | 9/1989 |
| WO | 01/37969 | 5/2001 |
| WO | 01/37970 | 5/2001 |
| WO | WO01/37969 * | 5/2001 ............ B01D 29/21 |

OTHER PUBLICATIONS

International Search Report and Written Opinion from corresponding International Application No. PCT/US2008/077451 mailed Apr. 4, 2009.

* cited by examiner

*Primary Examiner* — Joseph Drodge
*Assistant Examiner* — Cameron J Allen
(74) *Attorney, Agent, or Firm* — Renner, Otto, Boisselle & Sklar, LLP

(57) ABSTRACT

A filter media that inhibits the formation of static charge in a liquid flowing through the filter media comprises a filtration layer having a first surface and a second surface opposite the first surface and comprising a non-conductive fibrous material having a plurality of fibers, the fibrous material comprising a metal layer deposited on at least a portion of the fibers through at least a portion of the thickness of the filtration layer. The filter media or a filter apparatus incorporating the filter media does not require means for dissipating static charge from the fluid and, therefore, does not require grounding.

19 Claims, 2 Drawing Sheets

SURFACE MODIFIED FILTRATION MEDIA

CROSS-REFERENCE TO RELATED APPLICATIONS

The present application claims the benefit of the filing date of U.S. Provisional Application Ser. No. 60/974,593, filed Sep. 24, 2007, which is incorporated herein by reference in its entirety.

FIELD OF THE INVENTION

The present invention relates to filter media for a fluid filter, and more particular to a filter media that inhibits formation of static electric charge in a fluid passing through the filter media.

BACKGROUND

Filter apparatus are known for filtering particles in a fluid stream. The filtration operation essentially removes particles of a particular size from the fluid stream to cleanse the fluid stream of contaminants. The filter media typically utilize fine fibers and have the necessary void volume to process increased flows without exhibiting a high pressure drop. The fibers may be made of materials such as, for example, fiberglass, synthetic fibers, or even natural fibers.

As the fluid flows through the filter apparatus, certain liquids such as hydraulic fluids and diesel and gasoline fuels can have resistance to the conductance of electricity. As such, a static charge can build up within the liquid from the action of the non-conductive liquid flowing through the non-conductive filter media. With some of the more advanced compositions of filter media, and with the increasing use of ashless, synthetic, and biodegradable fluids with low conductivity values (i.e., little or no metal additives), static charge can accumulate within the filter apparatus. When the potential between the liquid and a conductive housing component reaches a certain level, a spark can jump to a surface of the housing component. This can be undesirable in many situations.

One technique for removing the static charge in the fluid is to add an anti-static agent such as DuPont Stadis 450 to make the fluid slightly conductive. However, anti-static agents can lose potency over time and will typically have to be re-added (re-doped) to the fluid at regular intervals.

Another technique to removing the static charge has been to introduce a conductive material, e.g., conductive particles or conductive fibers into the filter media along with the non-conductive fibers. Other attempts at solving the build up of static charge include the use of fine stainless steel mesh downstream of the fiberglass media. This approach requires the stainless steel mesh to be grounded to earth to carry away charge (U.S. Pat. No. 6,099,726).

SUMMARY

The present invention provides a filter media suitable for filtering a prescribed liquid, methods of making such filter media, and methods of filtering a liquid using the filter media. The filter media inhibits the formation of static charges.

Accordingly, in one aspect, the present invention provides a filter media for filtering a prescribed liquid flowing therethrough comprising a filtration layer having a first surface and a second surface opposite the first surface and comprising a non-conductive fibrous material having a plurality of fibers, the fibrous material comprising a metal layer deposited on at least a portion of the fibers through at least a portion of the thickness of the filtration layer, the filtration layer inhibiting formation of a static charge in a liquid when a liquid passes through the media. Such an arrangement does not require other means to dissipate a static charge and, therefore, does not require grounding. For example, a filter media in accordance with the present invention does not require (i) means to dissipate the charge such as, for example, large steel fibers that can migrate downstream into a sensitive component and/or affect the porosity of the filter media, which may be detrimental to the dirt holding capacity and flow capacity of the filter media, and/or (ii) means, such as expensive stainless mesh, downstream to dissipate the charge.

At least a portion of the fibers throughout the entire thickness of the filtration layer may be metalized. Substantially all the fibers of the filtration layer may be metalized throughout substantially the entire thickness of the filtration layer. The metal layer may include a variety of metals including, for example, aluminum.

In another aspect, the present invention provides a method of making a filter media for filtering a prescribed fluid comprising providing a filtration layer having a first surface and a second surface opposite the first surface, the filtration layer comprising a non-conductive fibrous material having a plurality of fibers; depositing a metal layer on at least a portion of the fibers of the fibrous material through at least a portion of the thickness of the filtration layer, the metal layer comprising a metal having a position in the triboelectric series closer to the prescribed fluid than the position of the fibrous material relative to the prescribed fluid.

In still another aspect, the present invention provides a filter assembly for filtering particulates in a liquid system, the filter assembly comprising a housing for receiving a filter cartridge, the housing including a tubular housing portion; a filter cartridge disposed in the housing, the filter cartridge having a filler media for providing a predetermined particle filtration efficiency, the filter media comprising a filtration layer having a first surface and a second surface opposite the first surface and comprising a non-conductive fibrous material having a plurality of fibers, the filtration layer comprising a metal layer deposited on at least a portion of the fibers of the fibrous material through at least a portion of the thickness of the filtration layer, the filtration layer inhibiting formation a static charge in a liquid when a liquid passes through the filtration layer; an end cap supporting the filter assembly, the end cap having an opening receiving a portion of the housing.

Further features of the invention will become apparent from the following detailed description when considered in conjunction with the drawings.

DETAILED DESCRIPTION

Figure 1:
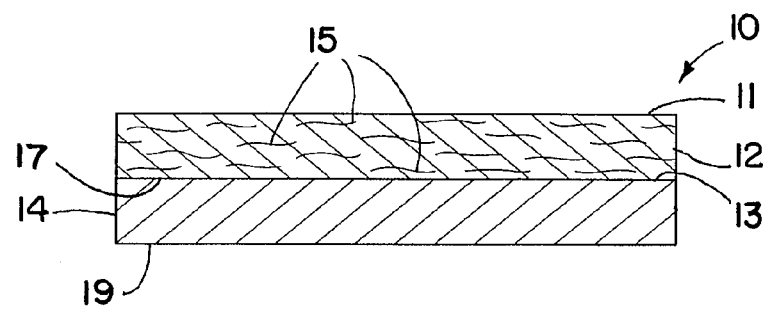
FIG. 1 is a cross-sectional view of an exemplary filter media in accordance with the present invention.

Certain terminology may be employed in the description to follow for convenience rather than for any limiting purpose.

For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

All ranges and ratio limits disclosed in the specification and claims may be combined in any manner. It is to be understood that unless specifically stated otherwise, references to "a", "an", and/or "the" may include one or more than one and that reference to an item in the singular may also include the item in the plural. All combinations specified in the claims may be combined in any manner.

Referring now to the drawings in detail, FIG. 1 shows a filter media 10 comprising a filtration layer 12 having a first surface 11, a second surface 13 opposite the first surface 11, and a support layer 14 having a first surface 17 and a second surface 19, the first surface of the support layer being disposed adjacent the second surface 13 of the filtration layer. The filtration layer 12 is formed from a fibrous material and comprises a plurality of fibers 15. In accordance with the present invention, at least a portion of the fibers 15 throughout at least a portion of the thickness of the filtration layer 12 are metalized and have a metal layer deposited thereon.

The filtration layer 12 may be formed from any suitable non-conductive fibrous material having a plurality of fibers. Suitable fiber materials include, but are not limited to, glass fibers and polymer fibers. Suitable glass fibers include, for example, fiberglass, microglass, and the like. Suitable polymer fibers include, for example, meltblown polymer fibers such as nylon fibers (e.g., nylon 6 and nylon 11) and polyester based fibers (e.g., PET, PBT, and the like).

The filtration layer may have any suitable thickness and porosity as desired depending on the particular filtering application. The filtration layer may have a thickness, for example, of from about 2 mil to about 20 mil (from about 50 µm to about 510 µm), and about 5 mil to about 15 mil (from about 127 µm to about 381 µm), or from about 5 mil to about 10 mil (from about 127 µm to about 254 µm). The porosity may be selected based on the application and the desired efficiency.

At least a portion of the fibers through at least a portion of the thickness of the filtration layer are metalized and comprise a metal layer deposited thereon. That is, desirably, not just the fibers along a surface of the filtration layer are metalized but fibers throughout at least a portion of the thickness of the filtration layer are also metalized. In one embodiment, at least a portion of the fibers of the filtration layer throughout the entire thickness of the filtration layer are metalized. In another embodiment, substantially all the fibers of the filtration layer throughout the entire thickness of the filtration layer are metalized. The fibers may be metalized by any suitable method including, for example, vacuum depositing a metal onto the fibers. The metallization process, such as by vacuum deposition, may involve the infusion of metal particles onto the fibers.

The metal may be selected as desired for a particular purpose or intended use. The metal(s) of the metal layer may be chosen such that they have a position on the triboelectric series that is closer to the liquid to be filtered than is the position of the fibrous material of the filtration layer relative to the liquid to be filtered. Examples of suitable metals include, but are not limited to, aluminum, nickel, copper, vanadium, titanium, silver, palladium, platinum, tin, chromium, or a combination of two or more thereof. An exemplary metal for metalizing the fibers is aluminum. The thickness of the metal layer on the fibers may be selected as desired for a particular purpose or intended use. Typically the metal layer is provided as a thin film. Desirably, the thickness of the metal layer is provide such that the metalized layer does not significantly alter the pore structure or the void volume (the porosity) of the filter media. The metal layer on the metalized fibers may be, for example, from about 100 angstroms to about 400 angstroms.

The support layer is not particularly limited and may be formed, for example, from a fabric. The fabric may be woven, non-woven, felt, spunbonded, knitted, and the like. The fabric may be provided as a mesh screen or a fibrous layer formed from any suitable material including, for example, polyester, polypropylene, felt, acrylic, etc. The support layer(s) may also be metalized to provide a metal layer thereon. In another embodiment, the support layer may be a conductive layer such as a carbon material or a carbon/polymer blend. An exemplary carbon/polymer blend is a carbon/polyester blend.

Figure 2:
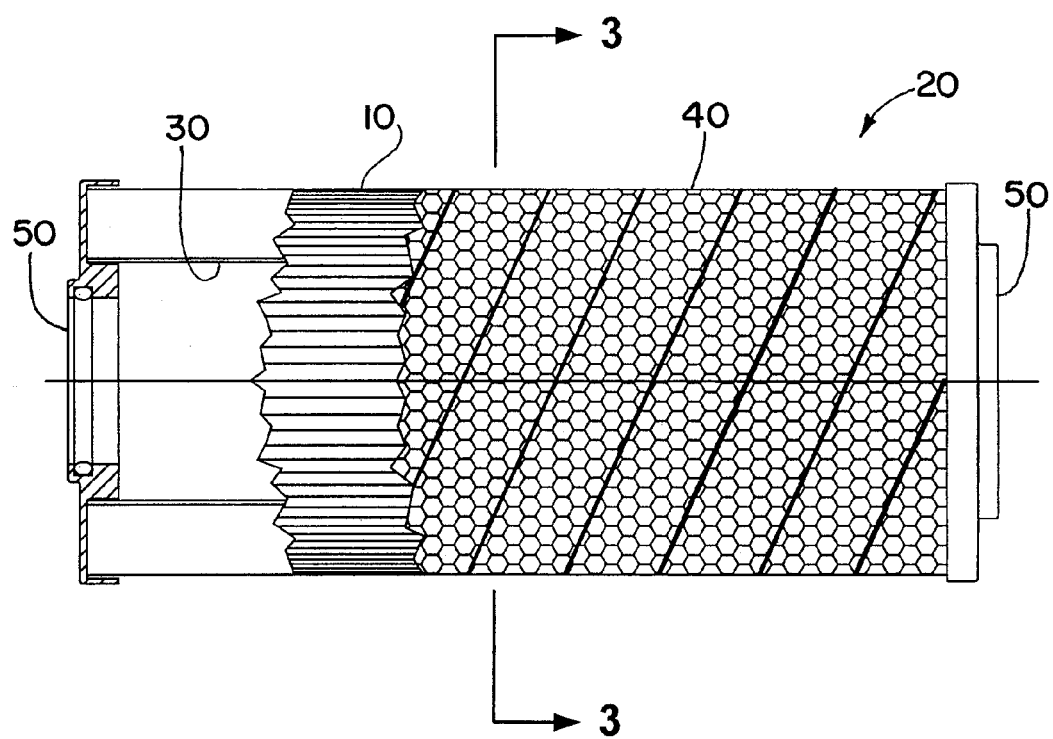
FIG. 2 is a partial cut-away, side view of a filter assembly employing a filter media in accordance with the present invention.

The filter media 10 is suitable for filtering a liquid to remove particulates from the liquid. Referring to FIG. 2, the filter media 10 may be incorporated in a filter apparatus 20 for filtering a prescribed liquid. The filter apparatus 20 may include a central core 30, a filter media, e.g., filter media 10, disposed about the core 30, an outer sleeve 40 disposed about the filter media 10, and end caps 50 disposed on opposite ends of the apparatus. The central core 30 and the outer sleeve 40 may have relatively large openings or perforations to allow the fluid being filtered to pass through the filter apparatus substantially unimpeded.

Figure 3:
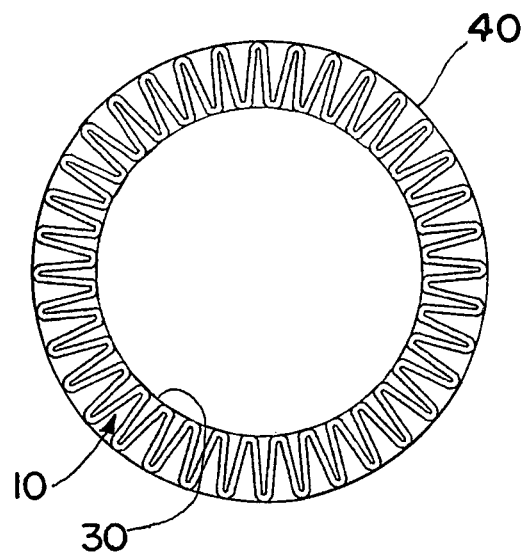
FIG. 3 is a cross-sectional end view of the filter assembly of FIG. 2 taken along line 3-3.

In an exemplary configuration, as shown in FIG. 3, the filter media 10 is provided as a pleated structure. The filter is provided such that the pleats extend longitudinally around the central core 30 and project radially outward from the core. The filter media may be pleated using techniques and equipment known to those skilled in the art. The circumferential ends of the pleated filter media may be attached together in any suitable manner including, for example, by an adhesive. It will be appreciated, however, that the filter media 10 may be provide in any configuration as desired for a particular purpose or intended use. For example, the filter media 10 may be unpleated and wrapped helically or spirally around the central core.

Figure 4:
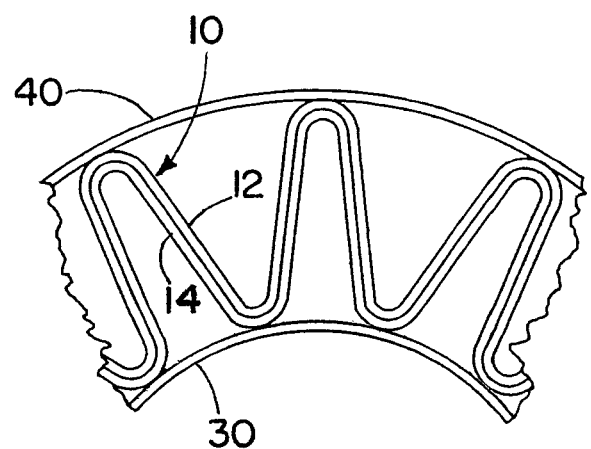
FIG. 4 is an enlarged sectional view of a portion of the assembly of FIG. 3.

The arrangement of the filter media in the filter apparatus may be provided based on the intended direction of flow of the liquid through the filter media. For example, if the liquid flow is to be directed radially inward through the filter apparatus, the filtration layer is oriented as an outer layer of the filter media, as illustrated in FIG. 4. It will be appreciated by those skilled in the art that the liquid flow could be directed to pass radially outward through the filter apparatus, in which case the filter media would be provided as the inner layer (relative to the support layer).

The filter media 10 is suitable for filtering a prescribed liquid to remove particulates therefrom. Additionally, the filter media 10 and a filter apparatus incorporating such a filter media has been found to inhibit or prevent formation of static charge within the fluid or filter system when the fluid is filtered. By providing a configuration capable of inhibiting the formation of a static charge in the system, the electric potential between the fluid and a conductive housing component is minimized. As such, there is no need to dissipate or remove static charge from the apparatus. Therefore, a filter media, or a filter apparatus comprising a filter media, in accordance with the present invention does not require means (e.g., steel fibers or steel mesh) to dissipate the static charge and remove it from the system. As such, a filter media or filter apparatus in accordance with the present invention does not require grounding.

The process for making the filter media may comprise providing a filtration layer comprising a fibrous material having a plurality of fibers, and depositing a metal layer on the fibers of the fibrous material. The filtration layer may be provided by any suitable method based on the fibrous material selected to form the filtration layer. Such methods are ascertainable by persons skilled in the art. Suitable methods may include wet laying techniques for materials such as fiberglass, microglass, and the like, and melt blown processing of polymers to provide polymer fibers. Other layers may be provided by suitable methods and may depend on the method for forming the filtration layer. For example, glass-based fibers may be formed by wet laying processes and formed directly onto a support layer. Other layers may be added after the filtration layer has dried. Alternatively, a filtration layer, such as a polymer based layer, may be provided as a separate structure and subsequently laminated to a support layer or other layers.

The process of depositing the metal is performed to provide metalized fibers throughout at least a portion of the thickness of the filtration layer and along each surface of the filtration layer. Depending on the fibrous material being used, and the thickness of the filtration layer, the process of metalizing the fibers may include depositing a metal along and through a first surface of the filtration layer and depositing a metal along and through a second surface of the filtration layer to ensure that each surface of the filtration layer has been metalized and that fibers disposed through the thickness of the filtration layer have been metalized. As previously described, a particularly suitable method for depositing a metal layer on the fibers is by vacuum deposition.

In one embodiment, a filtration layer is formed by wet laying a microglass on a spunbonded polyester fabric having a first surface and a second surface opposite the first surface using known wet laying techniques. The microglass is dried to form the filtration layer. In one embodiment, the filtration layer has a thickness of from about 2 to about 20 mil, and in another embodiment from about from about 5 to about 10 mils. The filtration layer has a first surface and a second surface opposite the first surface, the second surface of the filtration layer being disposed adjacent the first surface of the support layer. The microglass fibers are metalized by vacuum depositing a metal, such as aluminum, along and through the first surface of the filtration layer and then vacuum depositing aluminum along and through the second surface of the support layer, through the first surface of the support layer, and through the second surface of the filtration layer.

While a filter media has been described with reference to filter media 10, it will be appreciated that a filter media in accordance with the present invention may include more or fewer layers than those described. In FIGS. 1, 3, and 4, filter media 10 includes a filtration layer and a support layer downstream of the filtration layer. It will be appreciated that the filter media need not include the support layer 14. Alternatively, the filter layer may include additional layers upstream of the filtration layer. Other layers may include additional support layers, additional filter layers, pre-filter layers (which may also be referred to as capacity layers), and the like. A pre-filter layer increases the dirt holding capacity of the filter element. A pre-filter layer may be formed from any suitable material, which his ascertainable by a person skilled in the art. An exemplary material for a pre-filter layer is borosilicate microglass fibers with acrylic binder. The efficiency of the pre-filter layer is generally about one-tenth the efficiency of the filtration layer. Additionally, the filter apparatus 20 need not include an outer layer or a core layer.

A filter media in accordance with the present invention may be suitable for filtering a variety of fluids and is particularly suitable for filtering liquids. Suitable liquids include, but are not limited to, hydrocarbon based liquids, such as hydraulic fluids, fuels such as gasoline and diesel fuels, and the like.

Although the invention has been shown and described with respect to one or more exemplary embodiments, it is appreciated that alterations and modifications may occur to others skilled in the art upon reading and understanding the specification and the annexed drawings without departing from the precepts involved herein. It is intended that all matter contained in the foregoing description shall be interpreted as illustrative and not in a limiting sense. In addition, while a particular feature may have been described with respect to only one or more several illustrated embodiments, such feature may be combined with one or more other features of the other embodiments, as may be desired and advantageous for any given or particular application.

The invention claimed is:

1. A filter media for filtering a prescribed liquid flowing therethrough comprising:
   a filtration layer having a first surface and a second surface opposite the first surface and comprising a non-conductive fibrous material having a plurality of fibers, the fibrous material having a metal layer deposited on at least a portion of the fibers through at least a portion of the thickness of the filtration layer, the filtration layer inhibiting formation of a static charge in the prescribed liquid when a liquid passes through the media.

2. The filter media according to claim 1, wherein the metal layer on the fibrous material has a thickness of from about 100 to about 400 angstroms.

3. The filter media according to claim 1, wherein the metal layer comprises a metal chosen from aluminum, nickel, copper, vanadium, titanium, silver, palladium, platinum, tin, chromium, or a combination of two or more thereof.

4. The filter media according to claim 1, wherein the metal layer comprises aluminum.

5. The filter media according to claim 1, wherein the filtration layer has a thickness of from about 2 to about 20 mil.

6. The filter media according to claim 1, wherein the filtration layer has a thickness of about 5 to about 10 mil.

7. The filter media according to claim 1, wherein the metal layer deposited on the fibers is deposited through substantially the entire thickness of the filtration layer.

8. The filter media according to claim 1, wherein the non-conductive fibrous material comprises fibers chosen from fiberglass, microglass, a melt blown polymer fiber, or a combination of two or more thereof.

9. The filter media according to claim 1, comprising a support layer adjacent at least one of the first or second surfaces of the filtration layer.

10. The filter media according to claim 1, wherein the metal of the metal layer has a position on the triboelectric series that is closer to the prescribed fluid than the position of the fibrous material relative to the prescribed fluid.

11. A method of filtering a liquid comprising introducing a flow of liquid through the fiber media of claim 1.

12. The method of claim 11, wherein the liquid comprises a hydrocarbon.

13. A method of making a filter media for filtering a prescribed fluid comprising:
   providing a filtration layer having a first surface and a second surface opposite the first surface, the filtration layer comprising a non-conductive fibrous material having a plurality of fibers;
   selecting a metal having a position in the triboelectric series closer to the prescribed fluid than the position of the fibrous material relative to the prescribed fluid; and
   depositing the metal to form a metal layer on at least a portion of the fibers of the fibrous material through at least a portion of the thickness of the filtration layer.

14. The method according to claim 13, wherein depositing the metal comprises vacuum depositing the metal onto the fibers of the fibrous material.

15. The method according to claim 13, wherein the metal layer comprises a metal chosen from aluminum, nickel, copper, vanadium, titanium, silver, palladium, platinum, tin, chromium, or mixtures of two or more thereof.

16. The method according to claim 13, wherein the filtration layer has a thickness of from about 2 to about 20 mil.

17. The method according to claim 13, wherein the filtration layer has a thickness of from about 5 to about 10 mil.

18. The method according to claim 13, wherein the thickness of the metal layer on the fibers is from about 100 angstroms to about 400 angstroms.

19. A filter assembly for filtering particulates in a liquid system, the filter assembly comprising:
   a housing for receiving a filter cartridge, the housing including a tubular housing portion;
   a filter cartridge disposed in the housing, the filter cartridge having a filler media for providing a predetermined particle filtration efficiency, the filter media comprising a filtration layer having a first surface and a second surface opposite the first surface and comprising a non-conductive fibrous material having a plurality of fibers, the filtration layer comprising a metal layer deposited on at least a portion of the fibers of the fibrous material through at least a portion of the thickness of the filtration layer, the filtration layer inhibiting formation a static charge in a liquid when a liquid passes through the filtration layer; and
   an end cap supporting the filter assembly, the end cap having an opening receiving a portion of the housing.

* * * * *